United States Patent [19]

Nakano

[11] Patent Number: 5,230,023
[45] Date of Patent: Jul. 20, 1993

[54] METHOD AND SYSTEM FOR CONTROLLING AN EXTERNAL MACHINE BY A VOICE COMMAND

[75] Inventor: Fumio Nakano, Tokyo, Japan

[73] Assignee: NEC Corporation, Tokyo, Japan

[21] Appl. No.: 648,470

[22] Filed: Jan. 30, 1991

[30] Foreign Application Priority Data

Jan. 30, 1990 [JP]  Japan .................................. 2-20321

[51] Int. Cl.⁵ .............................................. H04B 1/46
[52] U.S. Cl. ..................................... 381/110; 381/43; 379/67; 379/90
[58] Field of Search ..................... 381/110, 43; 379/90, 379/67, 131

[56] References Cited

U.S. PATENT DOCUMENTS 4,593,403  6/1986  Kishi et al. .............................. 381/86
4,945,570  7/1990  Gerson et al. ....................... 381/110

Primary Examiner—Jin F. Ng
Assistant Examiner—Nina Tong
Attorney, Agent, or Firm—Sughrue, Mion, Zinn Macpeak & Seas

[57] ABSTRACT

In a method for controlling an external machine by a voice command, a voice pattern which is extracted from a voice supplied through a microphone is compared with reference voice patterns to pick up one of them which corresponds to a certain voice command to control an external machine, and a similarity between the voice pattern and the reference voice pattern is calculated. Then, a control signal is supplied to the external machine after a waiting time passes. The waiting time is determined dependent on the similarity such that the waiting time is relatively long when the similarity is low and is determined relatively short when the similarity is high, so that an operator has a sufficient time to judge whether the voice command is the desired one.

11 Claims, 5 Drawing Sheets

METHOD AND SYSTEM FOR CONTROLLING AN EXTERNAL MACHINE BY A VOICE COMMAND

FIELD OF THE INVENTION

This invention relates to a method and a system for controlling an external machine by a voice command, and more particularly to, a method and a system for controlling an external machine by a voice command in which a voice command is analyzed to control an external machine by comparing the voice analyzed patterns with reference voice patterns.

BACKGROUND OF THE INVENTION

Control systems of external machines by a voice command have been developed in recent years. In a first conventional control system of an external machine by a voice command, a voice command is supplied via a microphone to the control system to control an external machine, and an operator of the control system is informed visually or aurally that the voice command is a accepted. If the operator confirms that the accepted voice command is a desired command, the operator supplies a confirmation signal to the control system to supply the machine with a command signal to controll, so that the machine is controlled to operate in accordance with the voice command. If the operator recognizes that the accepted voice command is not the desired command, the operator may not supply a confirmation signal, so that the machine may not be controlled to operate by the voice command.

In a second conventional control system of an external machine by a voice command, a command signal is supplied to an external machine after a predetermined waiting time passes upon the acceptance of the voice command, so that the machine is controlled to operate automatically unless an operator of the control system supplies a halt command to the system in the predetermined waiting time.

According to the first and second conventional control systems of external machines by a voice command, however, there are disadvantages as described below.

In the first conventional control system of an external machine by a voice command, it is troublesome for the operator to supply a confirmation signal every time the voice command is accepted, especially when the voice command is a desired one.

In the second conventional control system of an external machine by a voice command, after the operator judges whether the accepted voice command is a desired one or not, the operator must supply a halt command to the system in the predetermined waiting time, when the accepted voice command is not the desired one. Therefore, if the waiting time is set to be long, operation time becomes long. On the other hand, if the waiting time is set to be short, the operator is required to supply the halt command quickly.

SUMMARY OF THE INVENTION

Accordingly, it is an object of the invention to provide a method and a system for controlling an external machine by a voice command in which the operator is released from a troublesome operation of supplying a confirmation signal when the voice command is a desired one.

It is a further object of the invention to provide a method and a system for controlling an external machine by a voice command in which the operator has a sufficient time to supply a halt command to the system when the accepted voice command is not a desired one.

According to a first feature of the invention, a method for controlling an external machine by a voice command, comprises:

detecting a voice to be converted into an electric signal;

extracting a voice pattern from the electric signal;

comparing the voice pattern with reference voice patterns to pick up a certain reference voice pattern which corresponds to the voice pattern;

calculating a similarity between the voice pattern and the reference voice pattern; and supplying a control signal to the external machine to be operated unless a halt command is generated in a waiting time dependent on a calculating result of the similarity.

According to a second feature of the invention, a system for controlling an external machine by a voice command, comprises:

means for detecting a voice to be converted into an electric signal;

means for extracting a voice pattern from the electric signal;

means for storing reference voice patterns which correspond to control commands of an external machine to be controlled;

means for comparing the voice pattern with the reference voice patterns to pick up one of the reference voice patterns which is similar to the voice pattern;

means for calculating a similarity between the voice pattern and the reference voice pattern; and means for controlling the external machine to be operated by supplying a control signal thereto unless a halt command is generated in a waiting time dependent on a calculating result of the similarity.

BRIEF DESCRIPTION OF THE DRAWINGS

The invention will be described in more detail in conjunction with appended drawings wherein.

DESCRIPTION OF THE PREFERRED EMBODIMENTS

Figure 1:
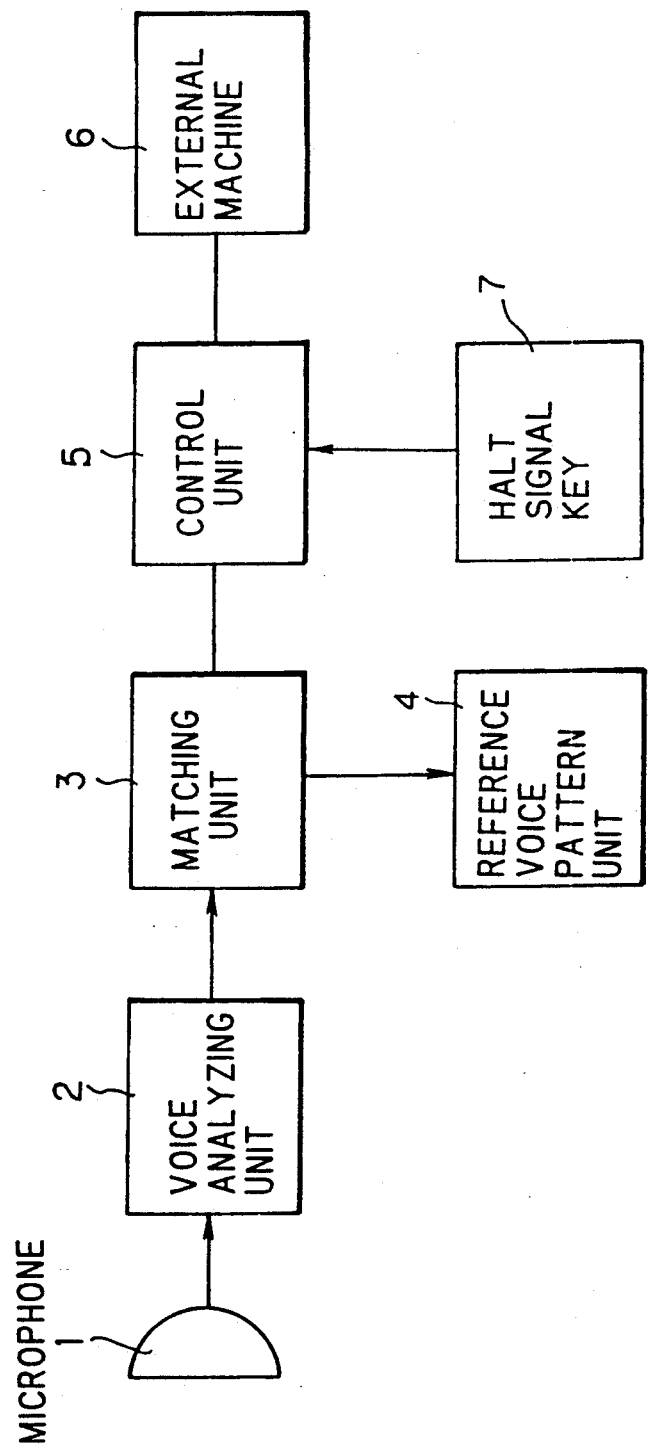
FIG. 1 is a block diagram showing a system for controlling an external machine by a voice command in a preferred embodiment according to the invention.

FIG. 1 shows a block diagram of a system for controlling an external machine by a voice command in a preferred embodiment. The control system comprises a microphone 1 which detects a voice and converts the voice into an electric signal, a voice analyzing unit 2 which extracts a voice pattern (input voice pattern) from the voice, a matching unit 3 which checks the matching between the input voice pattern and a reference voice pattern to pick up a reference voice pattern which corresponds to the input voice pattern, a reference voice pattern memory 4 which stores reference voice patterns corresponding to voice commands, a control unit 5 which judges a degree of similarity between the input voice pattern and the reference voice pattern and controls an external machine 6 such as a telephone set, a facsimile machine, etc. to be controlled in accordance with the degree of the similarity, and a halt signal key 7 for generating a halt signal to halt the control of the external machine 6.

Figure 2:
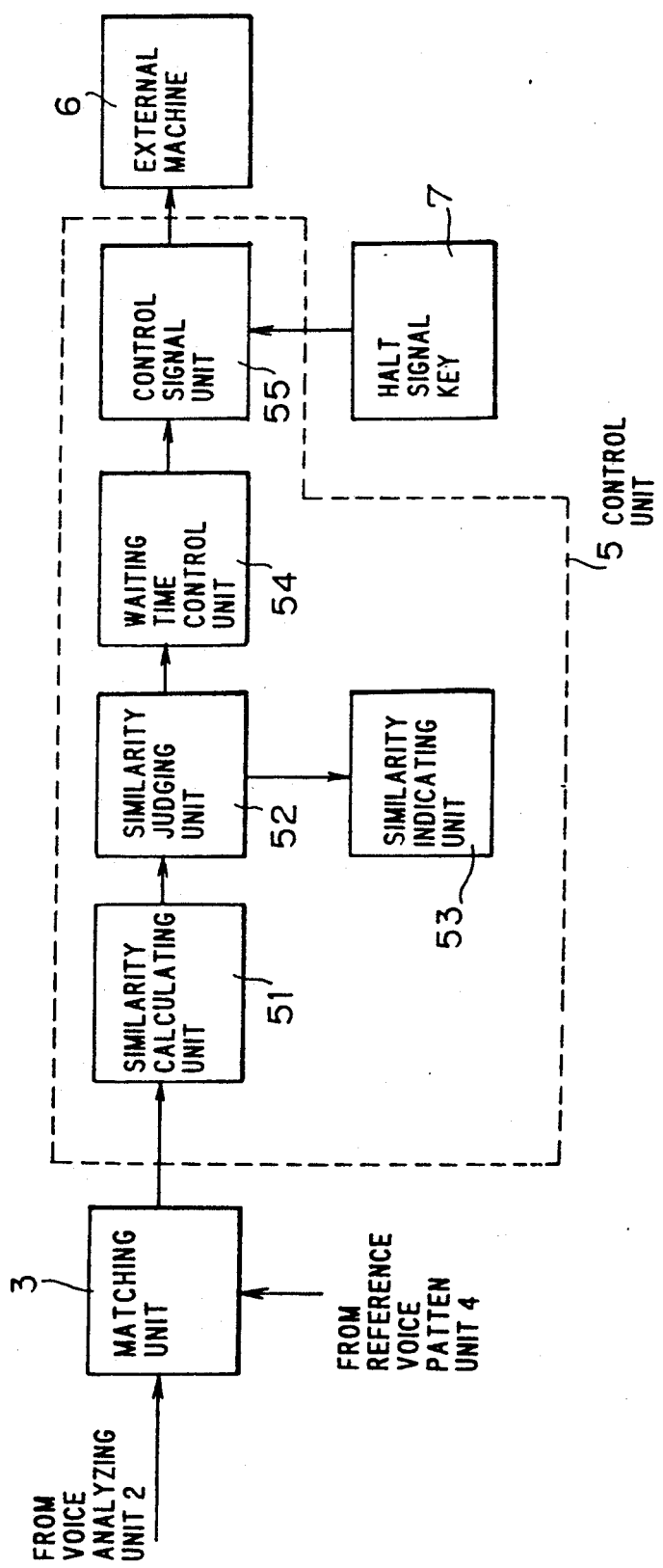
FIG. 2 is a block diagram showing a control unit of the control system of an external machine by a voice command in FIG. 1.

FIG. 2 shows a block diagram of the control unit 5. The control unit 5 comprises a similarity calculating unit 51 which calculates the similarity between the input voice pattern and the reference voice pattern, a similarity judging unit 52 which judges the degree of the similarity between the input voice pattern and the reference voice pattern by the similarity calculating result, a similarity indicating unit 53 which indicates the voice command and a content of the voice command such as a called party, a telephone number of the called party, etc. by an LCD display, a speaker, etc., a waiting time control unit 54 which sets a waiting time determined by the degree of the similarity, and control signal unit 55 for generating a control signal to control operation of the external machine 6 in consideration of the waiting time and the halt signal.

In operation, it is supposed that the external machine 6 is a telephone set in which dialing of a number is carried out by a voice command. In this case, when an operator makes a voice such as "TOKYO" which corresponds to a voice command to dial a number of a person in Tokyo toward the microphone 1, an electric signal converted from the voice by the microphone 1 is supplied to the voice analyzing unit 2, where a voice pattern (input voice pattern) is extracted from the voice. This input voice pattern is compared to check as to the matching with the reference voice patterns in the matching unit 3 to pick up a certain reference voice pattern which corresponds to the input voice pattern. Then, the compared results are supplied to the similarity calculating unit 51 of the control unit 5 to calculate a similarity between the input voice pattern and the reference voice pattern. The similarity may be provided as a distance in the similarity calculating unit 51 if the Dynamic Program matching method is used in the matching unit 3. The Dynamic Program matching method is described in U.S. Pat. No. 4,059,725 entitled "AUTOMATIC CONTINUOUS SPEECH RECOGNITION SYSTEM EMPLOYING DYNAMIC PROGRAMMING". In this case, the two voice patterns are more similar the shorter the distance is.

Thus calculated similarity, that is, a calculated distance is supplied to the similarity judging unit 52, where it is judged whether the distance is longer than a predetermined distance. Then, the result of the judgement in the similarity judging unit 52 is supplied to the similarity indicating unit 53, so that the voice command and a called party and a telephone number corresponding thereto are displayed on the LCD screen and/or voiced by the speaker. On the other hand, the result of the judgement in the similarity judging unit 52 is also supplied to the waiting time control unit 54, in which the waiting time is set to be a predetermined time dependent on the degree of the similarity. If a halt signal is not supplied from the halt signal key 7 to the control signal unit 55 in the waiting time, the telephone set (the external machine 6) is controlled to call the called party designated by the voice command "TOKYO" by a control signal supplied from the control signal unit 55.

On the other hand, if the distance is too long and the operator judges that the similarity between the input voice pattern and the reference voice pattern is not sufficient, the operator can stop operation of the control system by supplying a halt command from the halt signal key 7 to the control signal unit 55 in the waiting time which is thought to be sufficient for the operator to judge the similarity. Instead, the halt command may be supplied as a voice command such as "STOP" which is supplied to the microphone 1, so that the system will stop calling the called party when the voice command is recognized as the halt command.

Figure 3:
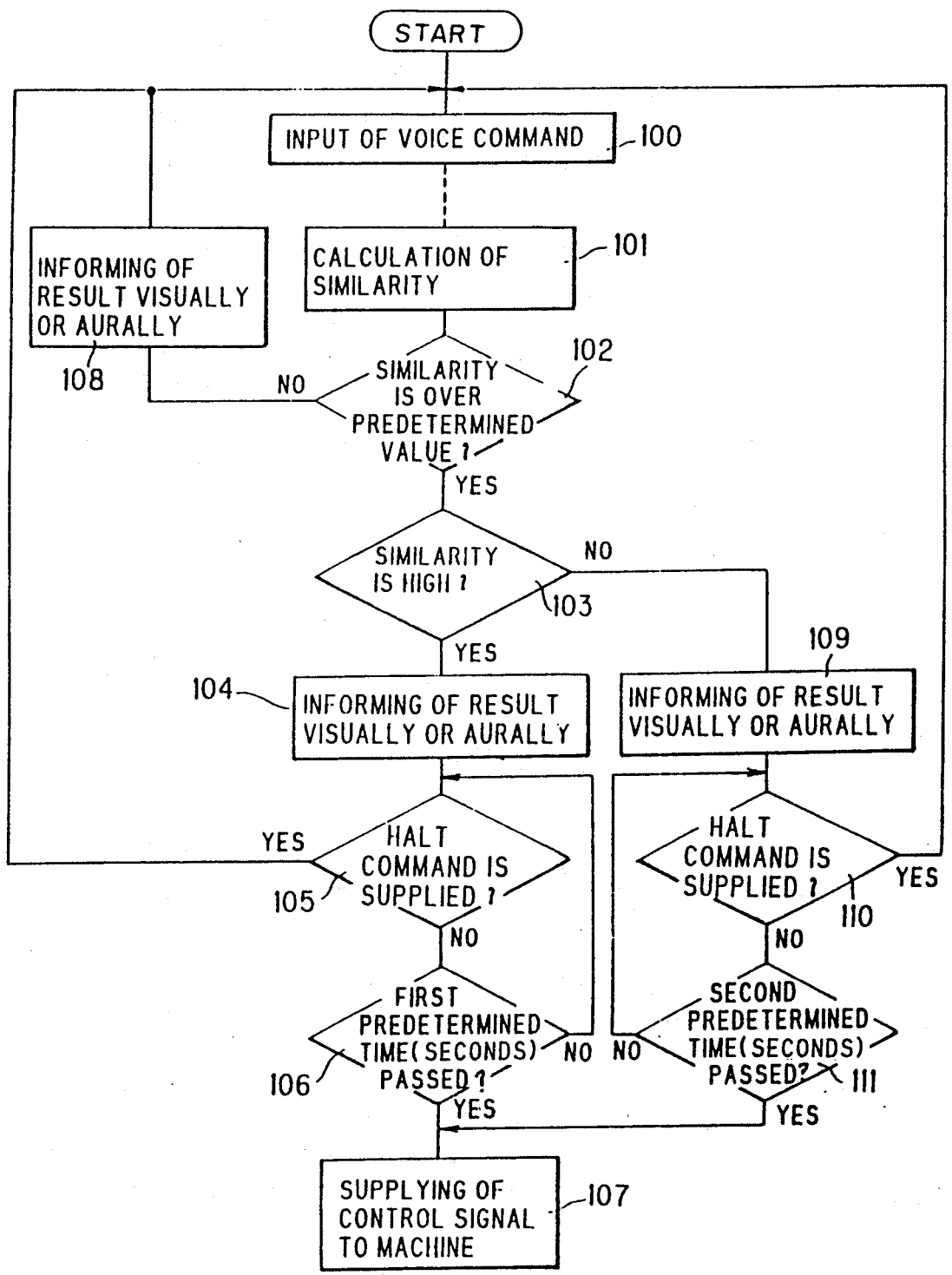
FIG. 3 is a flow chart explaining first operation of the control system of an external machine by a voice command in the preferred embodiment according to the invention.

FIG. 3 shows a flow chart of first operation in the control system in the preferred embodiment in which the waiting time of the halt command is determined automatically in accordance with the degree of the similarity. At first, a step 100 for input of a voice command is carried out, then matching operation is carried out (not shown in FIG. 3). After calculating of the similarity is carried out in a step 101, it is judged whether the similarity is over a predetermined value or not in a step 102. If it is so, then a step 103 is carried out, and if it is not so, then the result of the judgement in the step 102 is informed to the operator visually or aurally in a step 108, and then the operation is restarted from the step 100.

In the step 103, it is judged whether the similarity is quite high or not. If the the similarity is high, a step 104 is carried out. On the other hand, if the similarity is not high, then a step 109 is carried out.

In the step 104, the result of the judgement in the step 103, along with the corresponding voice command and the called party and the telephone number thereof, are informed to the operator visually or aurally, and then a step 105 is carried out, where it is checked whether a halt command is supplied. If an input of the halt command is recognized in the step 105, the operation is restarted from the step 100. And if an input of the halt command is not recognized, then it is checked whether a first predetermined waiting time which is relatively short, that is 3 seconds for instance, passes or not in a step 106. If not, the operation is repeated in a loop comprising the steps 105 and 106 until the first predetermined waiting time passes. If the first predetermined waiting time passes, the control signal is supplied to the external machine in a step 107, so that the machine is controlled in accordance with the voice command.

In the step 109, the result of the judgement in the step 103 is also informed to the operator visually or aurally like in the step 104. After that, it is checked whether a halt command is supplied in a step 110 like in the step 105. If an input of the halt command is recognized in the step 110, the operation is restarted from the step 100. And if not, then it is checked whether a second predetermined time which is relatively long, that is 5 seconds for instance, passes in a step 111. If not, the operation is repeated in a loop comprising the steps 110 and 111 until the second predetermined waiting time passes. If the second predetermined waiting time passes, the step 107 whose operation is explained above is carried out.

Figure 4A:
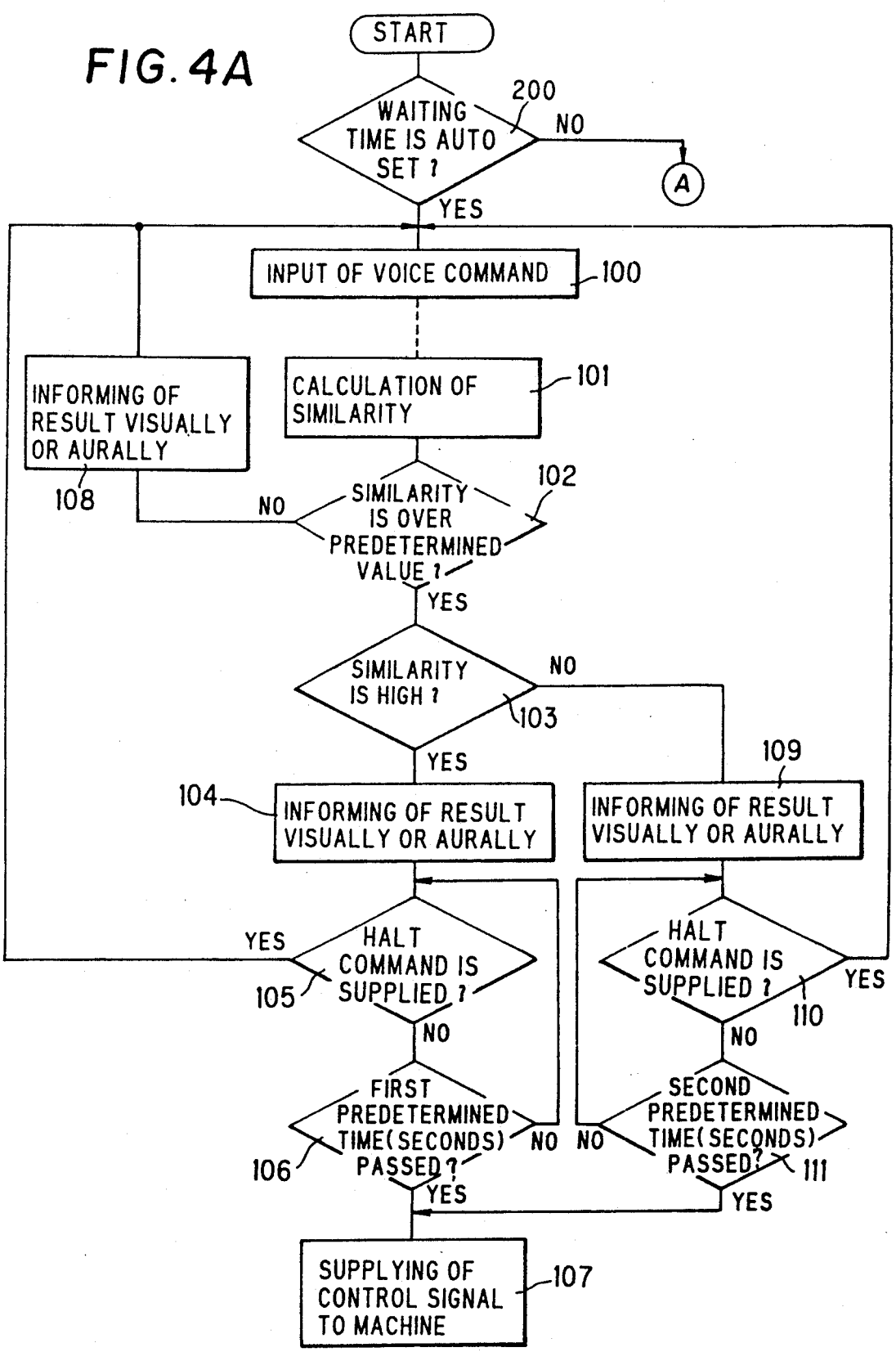
FIGS. 4A and 4B are flow charts explaining second operation of the control system of an external machine by a voice command in the preferred embodiment according to the invention.
Figure 4B:
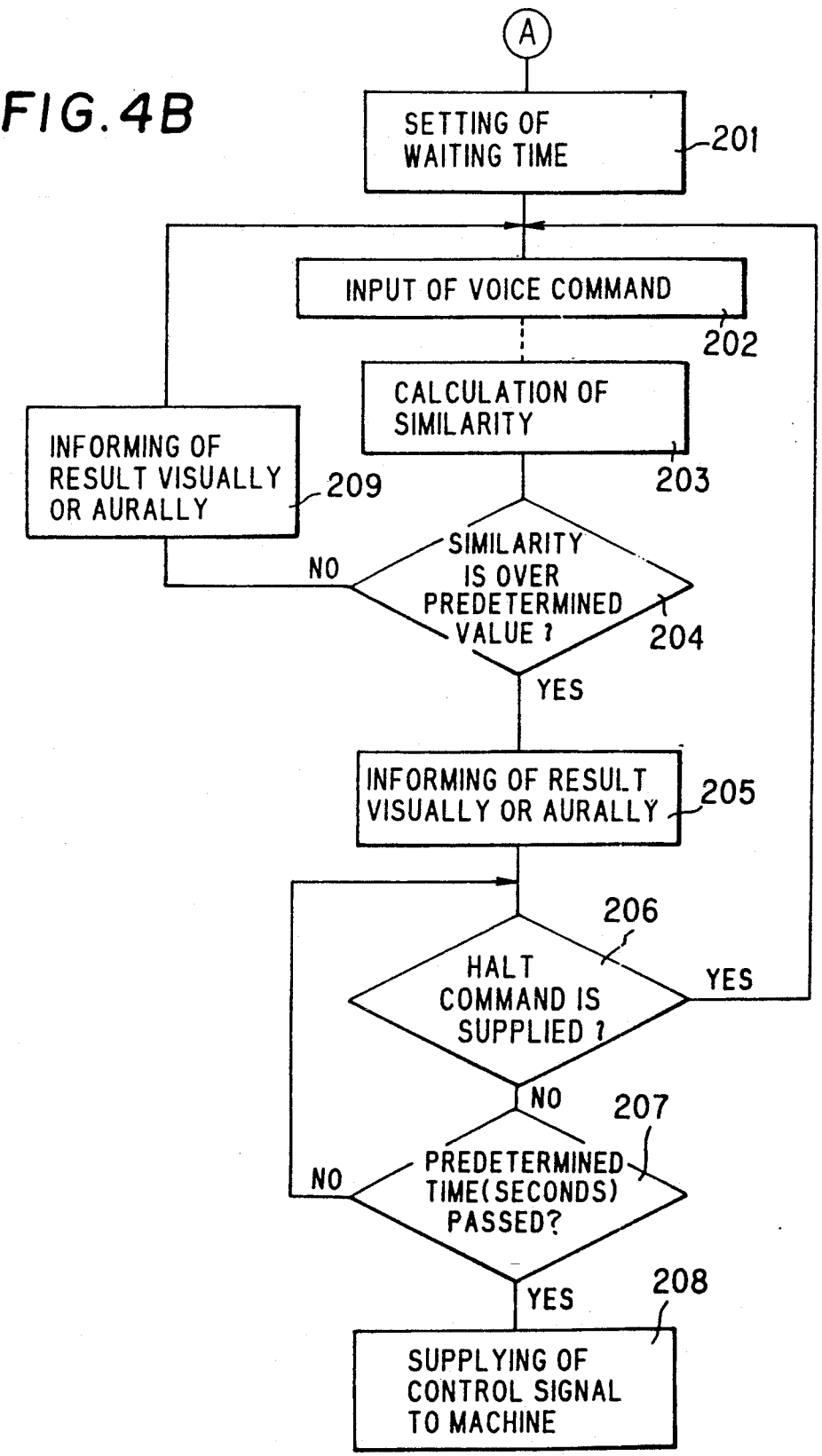

Next, FIGS. 4A and 4B shows flow charts of second operation in the control system in the preferred embodiment in which it is selected whether the waiting time of the halt command is set automatically or manually by an operator in a step 200 in FIG. 4A. If the automatical set of waiting time is selected, then steps 100 to 111 which are the same operation as in FIG. 3 are carried out.

If the manual set of waiting time is selected, then a step 201 is carried out in FIG. 4B, where a time of waiting for an input of a halt command is determined manually by the operator. Then, a step 202 for input of a voice command is carried out, then matching operation is carried out (not shown in FIG. 4B). After calculating of the similarity is carried out in a step 203, it is judged whether the similarity is over a predetermined value or not in a step 204. If it is so, then a step 205 is carried out, and if it is not so, then the result of the judgement in the step 203 is informed to the operator visually or aurally in a step 209, and the operation is restarted from the step 202.

In the step 205, the result of the judgement in the step 203 is informed to the operator visually or aurally, and then a step 206 is carried out, where it is checked whether a halt command is supplied. If an input of the halt command is recognized in the step 206, the operation is restarted from the step 202. And if not, then it is checked whether the predetermined time which is set in the step 201, that is 5 seconds for instance, passes in a step 207. If not so, the operation is repeated in a loop comprising the steps 206 and 207 until the predetermined time passes. If the predetermined time passes, the control signal is supplied to the external machine in a step 208, so that the external machine is controlled in accordance with the voice command.

Although the invention has been described with respect to specific embodiment for complete and clear disclosure, the appended claims are not to thus limited and alternative constructions that may occur to one skilled in the art which fairly fall within the basic teaching herein set forth.

What is claimed is

1. A method for controlling an external machine by a voice command, comprising steps of:
   detecting a voice to be converted into an electric signal;
   extracting a voice pattern from said electric signal;
   comprising said voice pattern with reference voice patterns to pick up a certain reference voice pattern which corresponds to said voice pattern;
   calculating a similarity between said voice pattern and said reference voice pattern; and
   supplying a control signal to said external machine to be operated unless a halt command is generated in a waiting time dependent on a calculating result of said similarity.

2. A method for controlling an external machine by a voice command, according to claim 1:
   wherein said comparing step comprises the step of carrying out the Dynamic Program method.

3. A method for controlling an external machine by a voice command, according to claim 1:
   wherein said supplying step comprises the step of setting said waiting time to be a first time when said similarity is high, and setting said waiting time to be a second time longer than said first time when said similarity is low.

4. A method for controlling an external machine by a voice command, according to claim 1:
   wherein said supplying step comprises the step of setting said waiting time to be long when said similarity is over a higher predetermined limited, and setting said waiting time to be short when said similarity is below a lower predetermined limit.

5. A method for controlling an external machine by a voice command, according to claim 1:
   wherein said supplying step comprises the step of setting said waiting time to be almost null when said similarity is over a higher predetermined limit.

6. A method for controlling an external machine by a voice command, according to claim 1:
   wherein said supplying step comprises the step of includes a step of halting of supplying said control signal to said external machine when said similarity is below a lower predetermined limit.

7. A method for controlling an external machine by a voice command, according to claim 6:
   wherein said halting step comprises the step of carrying out said halting by one of signals selected from a first signal generated by a voice command and a second signal generated by a key operation.

8. A system for controlling an external machine by a voice command, comprising:
   means for detecting a voice to be converted into an electric signal;
   means for extracting a voice pattern from said electric signal;
   means for storing reference voice patterns which correspond to control commands of an external machine to be controlled;
   means for comparing said voice pattern with said reference voice patterns to pick up one of said reference voice patterns which is similar to said voice pattern;
   means for calculating a similarity between said voice pattern and said reference voice pattern; and
   means for controlling said external machine to be operated by supplying a control signal thereto unless a halt command is generated in a waiting time dependent on a calculating result of said similarity.

9. A system for controlling an external machine by a voice command, according to claim 8:
   wherein said comparing means comprises means for carrying out using the Dynamic Programming method.

10. A system for controlling an external machine by a voice command, according to claim 8:
    wherein said controlling means comprises:
    means for judging whether said similarity is higher than a predetermined level;
    means for determining a waiting time dependent on an output signal of said judging means; and
    means for generating said control signal unless said halt command is generated in said waiting time dependent on said output signal.

11. A method for controlling an external machine by a voice command, comprising the steps of:
    detecting a voice to be converted into an electric signal;
    extracting a voice pattern from said electric signal;
    comparing said voice pattern with reference voice patterns to pick up a certain reference voice pattern which corresponds to said voice pattern;
    calculating a similarity between said voice pattern and said reference voice pattern; and
    supplying a control signal to said external machine to be operated unless a halt command is generated in a waiting time selectively set to a fixed value regardless of dependency on said calculating result.

* * * * *